United States Patent Office 2,824,048
Patented Feb. 18, 1958

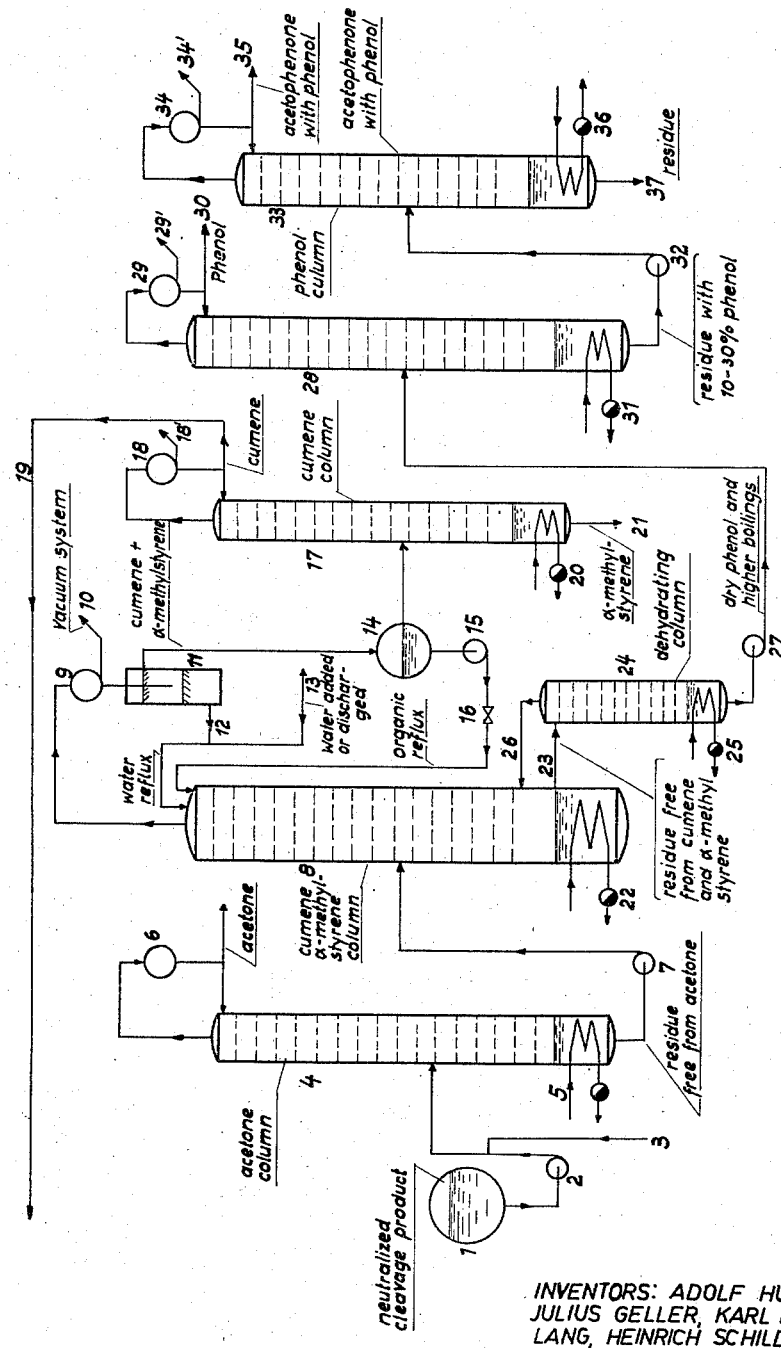

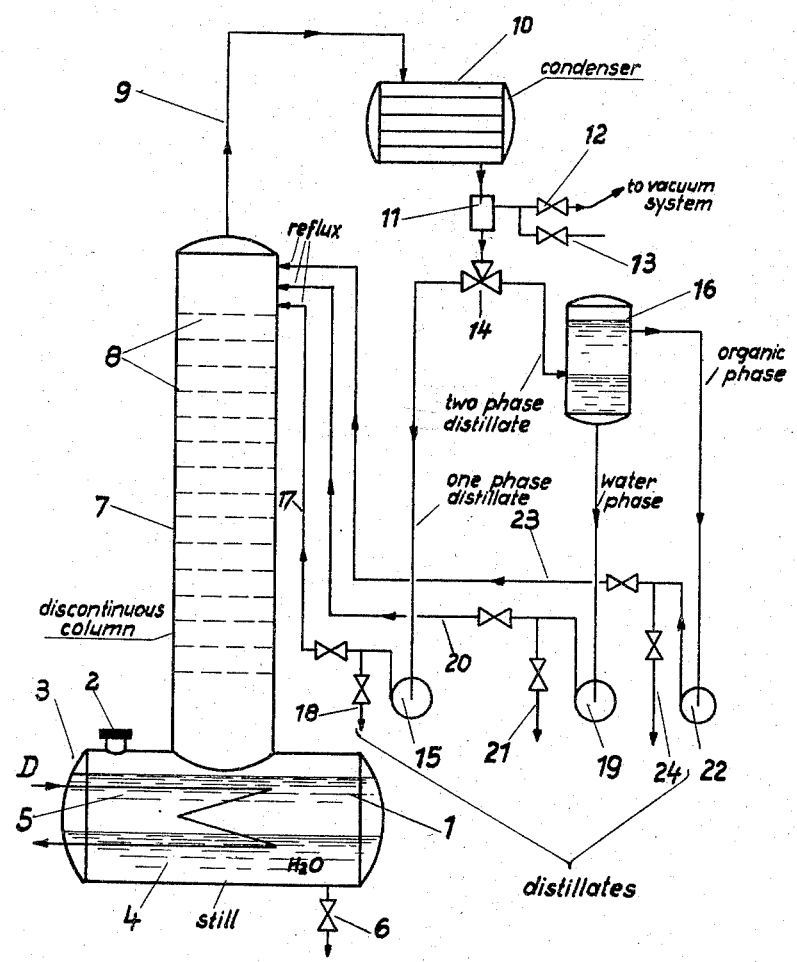

2,824,048

PROCESS FOR SEPARATING THE INGREDIENTS OF A REACTION MIXTURE OBTAINED BY THE OXIDATION OF CUMENE AND SUBSEQUENT CLEAVAGE OF THE HYDROPEROXIDE MIXTURE

Adolf Hupe, Frankfurt am Main, Julius Geller, Bad Homburg von der Hohe, Karl Friedrich Lang, Frankfurt am Main, Heinrich Schildwächter, Castrop-Rauxel, Erich Göschel, Neu Isenburg, near Frankfurt am Main, Franz Dostal, Frankfurt am Main, Oberrad, and Karl Heinz Koch, Frankfurt am Main, Germany, assignors to Rutgerswerke-Aktiengesellschaft, Frankfurt, Germany Application November 1, 1954, Serial No. 465,994

Claims priority, application Germany November 4, 1953

23 Claims. (Cl. 202—42)

This invention relates to the separation into their ingredients of mixtures containing phenyl, cumene and other components and it has particular relation to the separating treatment of reaction mixtures resulting from oxidation of cumene and subsequent decomposition of the hydroperoxide mixture.

It has been known that in the synthetic production of phenol from benzene over cumene, the mixture resulting from the decomposition step, contains, in addition to the phenol formed, a series of other compounds. First of all, the mixture contains unchanged cumene in concentration of 40 to 60%. Another principal ingredient of the mixture is the acetone formed by decomposition of the cumene hydroperoxide. Furthermore, as a result of various side reactions, aldehydes, α-methyl styrene, acetophenone, cumyl phenol and water are present in small amounts.

The formation of this mixture poses the problem of recovering the individual ingredients from the mixture in the desired condition of purity: the acetone must be extensively freed from water. The non-reacted cumene must be made practically free from α-methyl styrene and phenol, so that it can be re-introduced into the oxidation phase, without having an adverse effect on oxidation. The phenol must meet the conventional commercial requirements.

According to a known process, the above mentioned mixture is separated into its ingredients preferably by simple fractional distillation. The acetone is distilled off under normal pressure. Subsequently, under a pressure of 100 Torr., cumene containing several tenths percent of phenol and traces of methyl styrene, as impurities, is recovered. In a subsequent step, methyl styrene and phenol are discontinuously separated from the residue in the form of fractions having varying degrees of purity. Thereby, the amount of impurities in cumene, particularly the amount of phenol, is so high that extraction of phenol with sodium hydroxide solution must be applied. Furthermore, it is not possible to recover the total amount of phenol with the desired degree of purity, in this process.

According to another known process, the mixture is separated from acetone and subsequently distilled in the presence of water with steam. Thereby a cumene is obtained, which contains about 1% of methyl styrene and several tenths percent of phenol. This distillation is carried out at 760 Torr. The aqueous residue of of this distillation is processed either by extraction or distillation.

A further process known from the art is based on processing by extraction. In this process, after separation of acetone by distillation, the phenol is extracted from the reaction mixture with hot water. Recovery of phenol from the extract requires a second extraction by means of an organic solvent.

The above described prior processes have a number of disadvantages. Particularly in the separation of cumene, various difficulties are encountered, because during distillation cumene and phenol form a quasi-azeotropic mixture which practically cannot be separated by simple distillation. Not until extremely low pressures, e. g. 50 Torr. and less, are applied, are the equilibrium ratios of these substances such as to render reduction of the phenol content in the cumene distillate below 0.1%, possible.

In the above mentioned process, in which the residue freed from acetone is distilled in the presence of water, the distillate consists of a mixture which separates into an aqueous and an oily layer. Thereby it is necessary to apply an about sixfold reflux ratio of the oil layer in order to keep the phenol content of the distillate in the range of 0.1%. This sixfold ratio of the oil layer requires the use of a correspondingly high amount of water, which, of course, must be vaporized too and results in an extremely high heat consumption.

The procedure based on extraction could likewise not be applied with economic success, because water dissolves not only phenol, but, for example, also not insignificant portions of the acetophenone. After extraction, first the solvents must be removed and subsequently the products obtained must be processed by distillation for their preparation in pure condition. Unavoidable losses of solvent and the necessary energy consumption have prevented economic success of the extractive methods.

It has now been unexpectedly found that the above mentioned reaction mixture can be separated particularly economically into the individual ingredients in the manner described hereinafter by removal of acetone by distillation, subsequent distillation in the presence of water, under vacuum, and processing of the residual mixture.

Thereby the acetone is distilled off under normal pressure from the residue together with the aldehydes which subsequently can be separated from the acetone. In this process the water can be left completely in the sump product. It has been even found that it may be of advantage to introduce additional water in the distillation of acetone, for example in order to cover losses occurring in the second distillation step.

The cumene and α-methyl styrene are then distilled off together in the presence of water, with the application of vacuum. The selective effect of water on the various ingredients of the mixture is similar for cumene and α-methyl styrene. By the application of vacuum, the reflux ratio of the oily layer, which is necessary in order to obtain a head product practically free from phenol, can be considerably reduced. Moreover, by carrying out distillation under vacuum, the highest temperature occurring in this distillation step can be kept considerably below 100° C. so that polymerizations of methyl styrene and condensations of methyl styrene with phenol can be avoided. The amount of water which is present in the column system during distillation of the cumene+methyl styrene mixture, is preferably kept so high that the residual mixture, which is free from cumene and methyl styrene, still contains water. It has been found that if this condition is observed, the α-methyl styrene and phenol can be completely separated so that the mixture of these two components is never exposed to a temperature exceeding 100° C.

In carrying out the invention, the residue obtained in this step can be processed according to various procedures.

According to one procedure, the total amount of the residual mixture is processed by distillation, likewise under vacuum. Thereby distillates of water, phenol and higher boiling products are obtained.

According to another procedure, the layers formed upon standing of the residual mixture, can be processed separately. In the aqueous layer of lower specific gravity, primarily phenol and only small impurities of acetophenone are found. The oily layer of higher specific gravity contains in the first line acetophenone and cumyl phenol and some dissolved phenol. The aqueous layer can be separated by distillation into its ingredients in simple manner, preferably under vacuum. Thereby, practically pure phenol can be directly obtained. Another procedure consists in separating the phenol from the aqueous layer by extraction with an organic phenol-solvent, which is not soluble in water. The organic solvent can be separated from the phenol and from traces of acetophenone which may be present, in conventional manner, for example by distillation. The oily layer of the residue is separated into its ingredients in a manner known by itself. For example, phenol can be extracted by a solution of sodium hydroxide. The product freed from phenol is distilled under vacuum. The residue obtained in the distillation of the aqueous layer can be added to the oily layer prior to processing the latter.

In continuous operation for example acetone is distilled off under a pressure in the range of 500 to 1000 Torr. In order to obtain the acetone sufficiently free from water, the reflux ratio has to be kept between 3 and 10. The temperature in the sump is thereby controlled in such manner that the total amount of water introduced into distillation, remains in the residue. The sump temperature which meets this condition is about 5 to 10° C. lower than the boiling temperature of water corresponding to the pressure of the column sump.

In a second distilling column the residual mixture is distilled in the presence of water under vacuum. At the head of the column an azeotropic mixture of cumene+methyl styrene+water is obtained. This mixture is continuously decanted. It is preferred to introduce the total amount of the resulting water in the form of reflux into the column. It has been unexpectedly found that it is of advantage to use a part of the cumene+methyl styrene layer likewise as reflux in order to stabilize operation of the column and to reduce phenol content of the head product. The water content of the system can be controlled by adding or discharging water at the head of the column.

It has been further found that (a) the amount of water present in the system and (b) the amount of heat supplied to the column or the amount of the cumene+methyl styrene mixture used as reflux, must be adjusted to each other and this adjustment must be made in such manner that below the supply level at a certain height in the column a product is present which is practically free from cumene and methyl styrene and still contains essential amounts of water, while in the upper part of the column the azeotropic ratio is not exceeded in any direction.

At a distillation pressure of less than 500 Torr. it has been found that a reflux ratio of the cumene-methyl styrene layer of less than 2, and even less than 0.5, is sufficient for obtaining a head product which is sufficiently free from phenol in order to be re-used in the oxidation step.

Therefore, the energy consumption of the process according to the invention is extremely low and is in all cases considerably lower than in other procedures hitherto used for processing similar reaction mixtures.

The water-containing residue can be processed in various ways also in continuous operation. The simplest procedure, as far as the apparatus is concerned, consists in the joint distilling treatment of the water and oil layer. In proceeding in this manner, the mixture of both layers is supplied to the upper tray of a subsequent connected column or to a lower tray of a second column. By re-vaporization, in this column the entire amount of water is driven off from the residue. The vapors containing primarily water, can be introduced again directly into the second distilling column.

The mixture of cumene and methyl styrene obtained at the head of the second column is separated into these two ingredients by distillation, or subjected to complete hydrogenation to cumene in a connected hydrogenation apparatus, in conventional manner. The cumene thus produced must be, as known, practically free from methyl styrene, if it is supposed to be reintroduced into the oxidation step.

The residue remaining after separation of the cumene+methyl styrene mixture is now free from water too, and can be separated by distillation preferably under vacuum, in one or more connected columns, into practically pure phenol, a fraction containing an acetophenone+phenol mixture, and cumyl phenol. It has been found that an azeotropic mixture is thereby formed from phenol and acetophenone. The equilibrium conditions between the phenol and said azeotropic mixture have been found to be so favorable also under vacuum that for the separation of phenol a reflux ratio of about 1.5 and a maximum of 6 is sufficient.

The azeotropic mixture of acetophenone-phenol and eventually the cumyl phenol can be distilled off under low pressures subsequently, from the final residue.

It has been found that the amount of this residue, which consists of polymerization and condensation products, is unexpectedly low in the process of the present invention.

Some embodiments of the invention, showing a best mode of carrying out the invention, to which the invention is not limited, are described in the following examples and illustrated in the appended drawings. Figure 1 illustrates apparatus adapted to be used in the continuous process and Figure 2 illustrates apparatus suitable for the discontinuous procedure.

In Figure 1, the reaction mixture is supplied from container 1 by pump 2 to the acetone column 4. Water can be introduced, if desired, through pipe 3. By heating means 5 the sump of column 4 is heated only up to a level, at which the water remains in the residue. The acetone is condensed in condenser 6, and part of it is reintroduced as reflux into column 4, while the remaining part is discharged as product.

The residual mixture free from acetone is supplied by pump 7 to column 8. The head products enter condenser 9, which is connected at 10 to vacuum producing means not shown. The liquid condensed in 9 flows to separator 11, in which an aqueous layer and an oily layer are formed. The aqueous layer is reintroduced as reflux through pipe 12 into the head of column 8. Through conduit 13, the amount of water present in the system can be increased or decreased. The oily layer flows from separator 11 into container 14, from which part of this layer, regulated by valve 16, is supplied by pump 15 as reflux to the head of column 8. The excess of the head product is introduced into cumene column 17. The head product of the latter is introduced into condenser 18, from which part of the condensate is introduced as reflux into column 17, while another part is reintroduced through conduit 19 into the oxidation step. The heat necessary for revaporizing the methyl styrene is supplied to the sump of column 17 by heating means 20. The methly styrene is discharged at 21. 18' denotes connection of condenser 18 to the vacuum producing apparatus (not shown).

Heating device 22 supplies the necessary heat to the sump of column 8. The liquid sump mixture flows through tube 23 to the upper tray of column 24, which is heated by heating means 25. The vapors driven off in column 24 contain mainly water and are reintroduced through pipe 26 into column 8. The distillation residue which is free from cumene, methyl styrene and water is passed by pump 27 to phenol column 28. The head product enters condenser 29 connected at 29' to vacuum producing apparatus. The condensate discharged from condenser 29 is divided into reflux and product, whereby phenol is discharged at 30. The phenol column 28 is heated by heating means 31. The sump product of column 28, which contains only small amounts of phenol is supplied by pump 32 to the last column 33. Part of the head product of this column, which consists of a mixture of phenol and acetophenone and is condensed in condenser 34, is reintroduced as reflux into column 33 and remaining part is discharged as product at 35. Column 33 is heated by heating means 36. Condenser 34 is connected to vacuum producing apparatus at 34'. The sump residue formed in column 33 which is free from acetophenone, but still contains cumyl phenol, is discharged at 37.

In the discontinuous process according to the invention, the reaction mixture 1 is introduced through opening 2 into still 3 shown in Figure 2. Furthermore, a certain amount of water 4 is added to said mixture 1, the volume of water being about equal to the volume of cumene+methyl styrene present in mixture 1.

Still 3 is provided with heating coil 5, which can be heated e. g. by steam. Vessel 3 can be discharged at 6. Connected with vessel 3 is column 7 which is arranged above said vessel and contains bubble trays or filling bodies. The head of column 7 is connected by tube 9 with condenser 10, which is cooled by water. Separator 11 is connected over valve 12 with vacuum producing apparatus (not shown) or over valve 13 with the atmosphere.

Through the three-way cock 13, the condensate is passed either to pump 15 or to separator 16. Pump 15 supplies part of the condensate as reflux through tube 17 to the head of column 7 and the other part to the discharge valve 18.

In the operation of separator 16, the heavier phase flows to pump 19 which conducts it through conduit 20 to the head of column 7 and to the discharge 21, respectively. The light phase flows to pump 22 and is passed by the latter through conduit 23 to the head of the column and to discharge 24, respectively.

When distilling off acetone, the apparatus is kept under normal atmospheric pressure over valve 13. The condensate flows then through three-way cock 14 to pump 15.

After the acetone is completely separated, the apparatus is put under a permanent vacuum of less than 500 Torr. over valve 12 and the three-way cock is connected to separator 16. While the heavier phase consisting of water practically completely flows back through pump 19 and conduit 20 to the head of column 7, the bulk of the lighter cumene-methylstyrene phase is discharged through pump 22 from the apparatus at 24.

Subsequently, in the manner described for acetone, water is distilled off under normal atmospheric pressure or under vacuum. The water which contains some phenol can be reintroduced into the process together with the next charge of the reaction mixture.

Subsequently, as the next higher boiling component, phenol is distilled off with a reflux ratio of at least 1.5:1 under a vacuum of less than 400 Torr. in the same way as the water.

The remaining residue can be discharged through valve 6. In the apparatus shown, the mixture of cumene with methyl styrene can also be separated, if desired.

It will be understood that this invention is not limited to the steps, conditions, and apparatus specifically described above and illustrated in the drawings and can be carried with various modifications.

The head product of column 8 shown in the appended drawings is an azeotropic mixture of water+cumene+α-methyl styrene. The head product, which is condensed in condenser 9, separates in vessel 11 into a lower aqueous layer and an upper oily layer of cumene+methyl styrene.

In column 8, the amount of water present in the system, the amount of heat supplied to the column and the amount of cumene+methyl styrene reflux must be tuned to each other in such manner that below the level of supply to the column, at least at one level a product which is practically free from cumene and styrene and contains essential amounts of water, is present, while the limits of azeotropic ratio are observed in the upper part of the column. The sump product of column 8 substantially consists of a mixture of phenol, acetophenone, cumyl phenol and water.

The head product of column 17 is cumene which is practically free from impurities and can be re-used in the oxidation step. The head product of column 28 is substantially pure phenol, while the sump product of this column substantially consists of acetophenone, cumyl phenol and a small amount of phenol. The sump product of column 33 is substantially free from acetophenone, but contains cumyl phenol.

As stated above, the azeotropic mixture of cumene+methyl styrene+water is distilled off under vacuum in a condition substantially free from phenol at temperatures considerably below 100°, e. g. 60 to 85° C. so that no polymerization and/or condensation products of methyl styrene are formed.

The phenol-containing residue obtained by distilling off cumene and methyl styrene, can be subjected to further separation by vacuum disillation, preferably under a pressure of 150 to 300 Torr.

Examples of organic solvents which can be used with advantage for extraction of phenol from the aqueous layer according to the present invention are: butyl acetate, benzene, toluene and xylene.

In carrying out the invention as a continuous process, separation of acetone+aldehydes by distillation gave satisfactory results by carrying out this distillation for example under a pressure of 700 to 800 Torr., with a reflux ratio of for example 8 and a sump temperature of 100–105° C. and a sump pressure of 900–1000 Torr.

In column 8, in addition to the reflux water, additional water in the amount of for example 0.5 to 20%, based on the amount of the liquid to be distilled, can be introduced. The quantity of the cumene+methyl styrene reflux introduced, if desired, into column 8, amounts, for example to 30 to 80% based on the amount of the cumene+methyl styrene product.

As mentioned above, the starting material used in the process of this invention is obtained in conventional manner in the production of synthetic phenol by oxidation of cumene to cumene hydroperoxide and decomposition of the crude reaction mixture, whereby mixtures containing the above described ingredients are formed.

The term "Torr." is used in the present application to denote a unit of pressure equal to $1/760$ of normal atmospheric pressure and the term reflux ratio is used to denote the ratio of column reflux to the withdrawn product.

What is claimed is:

1. A process for separating the ingredients of a reaction mixture obtained by the oxidation of cumene and subsequent cleavage of the hydroperoxide mixture, said mixture containing acetone, cumene, α-methyl styrene, phenol, cumyl phenol, acetophenone and water, said process comprising freeing said reaction mixture, from acetone by fractional distillation, in which acetone is distilled off together with aldehydes as a top product of distillation; subjecting the residual mixture thus freed from acetone, to azeotropic fractional distillation in the presence of water under vacuum, at temperatures substantially below 100° C., water being present in the sump liquid during the entire step of this fractional azeotropic distillation, in order to completely distill off cumene and α-methyl styrene in the form of a head product which is practically free from phenol, and consists of an azeotropic mixture of cumene, α-methyl styrene and water, 2. A process for separating the ingredients of a reaction mixture obtained by the oxidation of cumene and subsequent cleavage of the hydroperoxide mixture, said mixture containing acetone, cumene, α-methyl styrene, phenol, cumyl phenol, acetophenone and water, said process comprising freeing said reaction mixture from acetone by fractional distillation, in which acetone is distilled off together with aldehydes as a top product of distillation; subjecting the residual mixture thus freed from acetone, to fractional azeotropic distillation in the presence of water under vacuum, at temperatures substantially below 100° C., water being present in the sump liquid during the entire step of this fractional azeotropic distillation, in order to completely distill off cumene and α-methyl styrene in the form of a head product which is practically free from phenol, and consists of an azeotropic mixture of cumene, α-methyl styrene and water and further processing the resulting residue in order to separately recover phenol and its by-products.

3. A process as claimed in claim 1, in which acetone is distilled off together with aldehydes under atmospheric pressure, substantially without distilling off water, from the reaction mixture.

4. A process as claimed in claim 1, in which acetone is distilled off together with aldehydes under atmospheric pressure, in the presence of added water, but substantially without distilling off water, from the reaction mixture.

5. A process as claimed in claim 1, in which fractional azeotropic distillation of the residual mixture freed from acetone is carried out under a pressure of less than 500 Torr.

6. A process as claimed in claim 1, in which the amount of water in the sump product of the fractionation step for distilling off cumene and α-methyl styrene, is kept high enough to yield a residue which still contains water after complete removal by azeotropic distillation of the cumene and α-methyl styrene and water and phenol is successively removed from said residue by fractional distillation under a pressure of less than 500 Torr.

7. A process as claimed in claim 1, in which the residue freed from acetone, cumene and methyl styrene, is allowed to separate into an aqueous layer containing the bulk of phenol and an oily layer containing the bulk of acetophenone, and these layers are processed separately in order to recover phenol and its by-products.

8. A process as claimed in claim 1, in which the residue freed from acetone, cumene and methyl styrene, is allowed to separate into an aqueous layer containing the bulk of phenol and an oily layer containing the bulk of acetophenone, and the aqueous layer is subjected to fractional distillation under a pressure below 500 Torr. in order to separate it into water, phenol and a residue containing acetophenone and phenol.

9. A process as claimed in claim 1, in which the residue freed from acetone, cumene and methyl styrene, is allowed to separate into an aqueous layer containing the bulk of phenol and an oily layer containing the bulk of acetophenone, and the aqueous layer is treated with a water-immiscible organic solvent in order to extract phenol and traces of acetophenone.

10. A process as claimed in claim 1, in which the residue freed from acetone, cumene and methyl styrene, is allowed to separate into an aqueous layer containing the bulk of phenol and an oily layer containing the bulk of acetophenone, and the oily layer is treated with an aqueous alkali solution in order to extract phenol, and the extracted residue is subjected to fractional distillation under vacuum in order to recover acetophenone and cumyl phenol.

11. A process as claimed in claim 1, in which the residue freed from acetone, cumene and methyl styrene, is allowed to separate into an aqueous layer containing the bulk of phenol and an oily layer containing the bulk of acetophenone; the aqueous layer is subjected to fractional distillation under vacuum in order to separate it into water, phenol and a residue containing acetophenone and phenol, and said residue is mixed with the oily layer, and the mixture is treated with an aqueous alkali solution in order to extract phenol and the extracted residue is subjected to fractional distillation under vacuum in order to recover acetophenone and cumyl phenol.

12. A process as claimed in claim 1, in which the reaction mixture is freed from acetone and aldehydes by a continuous first fractional distillation step under a pressure in the range of 500 to 1000 Torr., whereby the reflux ratio is kept in the range of 3 to 10 in order to obtain a head product sufficiently free from water and the sump temperature is kept 5° to 10° C. below the boiling temperature of water, corresponding to the pressure in the sump of said first fractionation step, in order to obtain a residue free from acetone.

13. A process as claimed in claim 1, in which the reaction mixture is freed from acetone and aldehydes by a continuous first fractional distillation step under a pressure in the range of 500 to 1000 Torr., whereby the reflux ratio is kept in the range of 3 to 10 in order to obtain a head product sufficiently free from water and the sump temperature is kept 5° to 10° C. below the boiling temperature of water, corresponding to the pressure in the sump of said first fractionation step, in order to obtain a residue free from acetone; the sump product of said first fractionation step is subjected, in the presence of water, to a continuous second fractional distillation step under vacuum to form an azeotropic cumene+methyl styrene+water head product; said head product is condensed and continuously decanted to a water layer and a cumene+methyl styrene layer; and water is introduced as reflux from said water layer into said second fractional distillation step.

14. A process as claimed in claim 1, in which the reaction mixture is freed from acetone and aldehydes by a continuous first fractional distillation step under a pressure in the range of 500 to 1000 Torr., whereby the reflux ratio is kept in the range of 3 to 10 in order to obtain a head product sufficiently free from water and the sump temperature is kept 5° to 10° C. below the boiling temperature of water, corresponding to the pressure in the sump of said first fractionation step, in order to obtain a residue free from acetone; the sump product of said first fractionation step is subjected, in the presence of water, to a continuous second fractional distillation step under vacuum to form an azeotropic cumene+methyl styrene+water head product; said head product is condensed and continuously decanted to a water layer and a cumene+methyl styrene layer; water is introduced as reflux from said water layer and cumene+methyl styrene is introduced as reflux from said cumene+methyl styrene layer into said second fractional distillation step.

15. A process as claimed in claim 1, in which the reaction mixture is freed from acetone and aldehydes by a continuous first fractional distillation step under a pressure in the range of 500 to 1000 Torr., whereby the reflux is kept in the range of 3 to 10 in order to obtain a head product sufficiently free from water and the sump temperature is kept 5° to 10° C. below the boiling temperature of water, corresponding to the pressure in the sump of said first fractionation step, in order to obtain a residue free from acetone; the sump product of said first fractionation step is subjected, in the presence of water, to a continuous second fractional distillation step under vacuum to form an azeotropic cumene+methyl styrene+water head product; said head product is condensed and continuously decanted to a water layer and a cumene+methyl styrene layer; water is introduced as reflux from said water layer and cumene+methyl styrene is introduced as reflux from said cumene+methyl styrene layer into said second fractional distillation step; the amount of water present in the second fractional distillation step, the amount of heat supplied to said step and the amount of cumene+methyl styrene reflux, being tuned to each other in such manner that the limits of azeotropic ratio between cumene+methyl styrene and water are observed in the vapor phase above the supply level of the fractionation step and, at least at one level below said supply level, residual mixture and water which are free from cumene and methyl styrene are present in said fractionation step.

16. A process as claimed in claim 15, in which the reflux ratio of the cumene+methyl styrene layer, is less than 2.

17. A process as claimed in claim 15, in which the reflux ratio of the cumene+methyl styrene layer, is less than 0.5.

18. A process as claimed in claim 15, in which the total sump product from the second fractional distillation step is freed from water in a first additional fractional distillation step and the water obtained in this distillation step is reintroduced into said second fractional distillation step.

19. A process as claimed in claim 1 in which the head product consisting of the azeotropic cumene+methyl styrene+water mixture is condensed and decanted in two layers, the oily layer of which is separated into its ingredients by an additional step of fractional distillation.

20. A process as claimed in claim 1 in which the head product consisting of the azeotropic cumene+methyl styrene+water mixture is condensed and decanted in two layers, the oily layer of which is subjected to hydrogenation to cumene.

21. A process as claimed in claim 1, in which a sump mixture freed from cumene, methyl styrene and water and containing phenol, acetophenone and cumyl phenol, is separated into its ingredients by fractional distillation under a pressure of 760 Torr.

22. A process as claimed in claim 1, in which a sump mixture freed from cumene, methyl styrene and water and containing phenol, acetophenone and cumyl phenol, is separated into its ingredients by continuous fractional distillation under a pressure of 760 Torr., and a reflux ratio of at least 1.5 is used in the distillation of phenol.

23. A process as claimed in claim 1, in which a sump mixture freed from cumene, methyl styrene and water and containing phenol, acetophenone and cumyl phenol, is separated into its ingredients by continuous fractional distillation, the phenol being distilled under a pressure of 760 Torr. with a reflux ratio of at least 1.5 and acetophenone and cumyl phenol being distilled under a low pressure in the range of 5 to 250 Torr.

References Cited in the file of this patent

UNITED STATES PATENTS

| | | |
|---|---|---|
| 2,587,497 | Joris | May 20, 1952 |
| 2,628,983 | Aller et al. | Feb. 17, 1953 |
| 2,669,541 | Catterall | Feb. 16, 1954 |
| 2,679,535 | Lavender et al. | May 25, 1954 |
| 2,702,784 | Rossi | Feb. 22, 1955 |
| 2,720,549 | Armstrong et al. | Oct. 11, 1955 |
| 2,727,074 | Bewley | Dec. 13, 1955 |

FOREIGN PATENTS

| | | |
|---|---|---|
| 496,061 | Belgium | June 15, 1950 |
| 512,889 | Belgium | Aug. 14, 1952 |
| 513,681 | Belgium | Sept. 15, 1952 |
| 670,444 | Great Britain | Apr. 16, 1952 |
| 504,557 | Canada | July 20, 1954 |
| 507,549 | Canada | Nov. 23, 1954 |